(12) United States Patent
Adachi et al.

(10) Patent No.: US 7,379,114 B2
(45) Date of Patent: May 27, 2008

(54) IMAGE DETERMINATION APPARATUS AND INDIVIDUAL AUTHENTICATION APPARATUS

(75) Inventors: Sumiaki Adachi, Shiga (JP); Masaru Morimoto, Shiga (JP)

(73) Assignee: OMRON Corporation, Kyoto (JP)

( * ) Notice: Subject to any disclaimer, the term of this patent is extended or adjusted under 35 U.S.C. 154(b) by 770 days.

(21) Appl. No.: 10/364,559

(22) Filed: Feb. 12, 2003

(65) Prior Publication Data

US 2003/0174868 A1   Sep. 18, 2003

(30) Foreign Application Priority Data

Feb. 14, 2002   (JP)   ............... 2002-037090

(51) Int. Cl.
*H04N 5/222*   (2006.01)
*H04N 9/47*    (2006.01)
*H04N 7/18*    (2006.01)
*H04N 5/228*   (2006.01)
*G06K 9/00*    (2006.01)

(52) U.S. Cl. ............... 348/370; 348/156; 348/77; 348/222.1; 382/118

(58) Field of Classification Search ............... 348/370, 348/371, 156, 161
See application file for complete search history.

(56) References Cited

U.S. PATENT DOCUMENTS

| | | | |
|---|---|---|---|
| 6,516,247 B2 * | 2/2003 | Funada ............... 700/245 |
| 6,841,780 B2 * | 1/2005 | Cofer et al. ............... 348/152 |
| 6,850,872 B1 * | 2/2005 | Marschner et al. ............... 703/2 |
| 6,873,713 B2 * | 3/2005 | Okazaki et al. ............... 382/118 |
| 6,882,741 B2 * | 4/2005 | Dobashi et al. ............... 382/118 |
| 6,956,616 B2 * | 10/2005 | Jung et al. ............... 348/370 |
| 7,006,672 B2 * | 2/2006 | Sato et al. ............... 382/118 |
| 7,050,608 B2 * | 5/2006 | Dobashi ............... 382/118 |
| 7,130,453 B2 * | 10/2006 | Kondo et al. ............... 382/118 |
| 2001/0031073 A1 * | 10/2001 | Tajima ............... 382/118 |
| 2003/0123710 A1 * | 7/2003 | Nakazawa et al. ............... 382/115 |

FOREIGN PATENT DOCUMENTS

| | | |
|---|---|---|
| JP | 61-118884 | 6/1999 |
| JP | 11-191856 | * 7/1999 |
| JP | 11-339048 | 12/1999 |
| JP | 2000-339466 | * 12/2000 |

* cited by examiner

*Primary Examiner*—David Ometz
*Assistant Examiner*—Nhan Tran
(74) *Attorney, Agent, or Firm*—Dickstein Shapiro LLP

(57) ABSTRACT

An image determination apparatus is provided which obtains a first image which is picked up by illuminating the subject of image pickup from a first position and a second image which is picked up by illuminating the subject of image pickup from a second position. The image determination apparatus determines whether or not the subject of image pickup is a living body from a change in shading on the first picked up image and the second picked up image. Further, an individual authentication apparatus that includes an image pickup unit and a control unit determines whether a subject is a living body from a change in shading on a first picked up image and a second picked up image. If the subject is a living body, an authentication function is initiated using a third picked up image, the authentication function determining whether or not to authorize the subject.

22 Claims, 9 Drawing Sheets

IMAGE DETERMINATION APPARATUS AND INDIVIDUAL AUTHENTICATION APPARATUS

FIELD OF THE INVENTION

The present invention relates to an image determination apparatus which determines whether a subject picked up with an image pickup apparatus such as a CCD camera is a living body or a nonliving body such as a photograph or a print and to an individual authentication apparatus, to which the image determination apparatus is applied, for authenticating a person who is the subject of image pickup in the case in which the subject of image pickup is a living body.

BACKGROUND OF THE INVENTION

Description of the Related Art

Conventionally, there have been some room entrance management systems for restraining a person from entering a room to which an individual authentication apparatus is applied. The individual authentication apparatus picks up a face of a person desiring to enter a room (hereinafter referred to as a subject of authentication) with a CCD camera (hereinafter referred to simply as camera) or the like and uses the picked up face image to determine whether the subject of authentication is a registered person who is allowed to enter the room.

The conventional individual authentication apparatus registers data of characteristic parts of a living body such as eye, a nose, and a mouth (hereinafter referred to as characteristic amount data), which is extracted from a face image picked up at the time of registration for each registered person, in a database. Authentication on whether a subject of authentication is a registered person or not is performed by:

<1> picking up a face of the subject of authentication with an image pickup apparatus such as a camera;

<2> extracting characteristic parts of a living body such as eye, a nose, and a mouth from a face image of the subject of authentication picked up here;

<3> calculating a degree of similarity with the characteristic parts extracted in above <2> for each registered person for whom characteristic amount data is registered in the database; and <4> determining that the subject of authentication is a registered person if a maximum value of the degree of similarity calculated in above <3> is equal to or more than a threshold value defined in advance and, on the contrary, determining that the subject of authentication is not a registered person if the maximum value is less than the threshold value.

When the individual authentication apparatus determines that the subject of authentication is a registered person, the room entrance management system allows the subject of authentication to enter a room. On the contrary, when the individual authentication apparatus determines that the subject of authentication is not a registered person, the room entrance management system prohibits the subject of authentication from entering the room.

In above <3>, a degree of similarity with the characteristic parts of the subject of authentication is calculated for each registered person. However, there is also an individual authentication apparatus, which adopts a system for giving identification numbers for respective registered persons in advance, causing a subject of authentication to input an identification number, and calculating a degree of similarity with characteristic parts of the subject of authentication only for a registered person of the inputted identification number. For example, an ID card having an identification number recorded therein is issued to each registered person in advance, and when the ID card is inserted in the individual authentication apparatus, the individual authentication apparatus reads the recorded identification number. Here, the individual authentication apparatus calculates a degree of similarity between characteristic amount data corresponding to the read identification number and the characteristic parts of the subject of authentication whose image is picked up this time, and determines whether or not the subject of authentication is a registered person from the degree of similarity calculated here.

However, the conventional individual authentication apparatus cannot determine whether a subject of image pickup of the image pickup apparatus is a subject of authentication himself/herself (living body) or a nonliving body such a photograph of a face of the subject of authentication or a print on which the face is printed. Therefore, the conventional individual authentication apparatus has a problem in that, since the subject of image pickup is processed as a living body even if a photograph of a face of a registered person or a print on which the face is printed is used as the subject of image pickup, security against illegal acts using a photograph of a face of a registered person or a print of the face is poor.

In addition, recently, in order to prevent illegal transactions using cash cards of others, financial institutions have been examining the application of the individual authentication apparatus to an apparatus for transaction such as an ATM or a CD, and improvement of security against the illegal acts is desired.

SUMMARY OF THE INVENTION

The present invention has been devised in view of the above and other drawbacks, and it is an object of the invention to provide an image determination apparatus which is capable of determining whether a subject of image pickup is a living body or a non-living body such as a photograph of a face or a print on which a face is printed.

In addition, it is another object of the invention to provide an individual authentication apparatus in which security against illegal acts using a photograph of a face or a print of a face as a subject of image pickup is improved by applying the image determination apparatus thereto.

In order to solve the above-described problem, the image determination apparatus of the invention is provided with structures described below.

(1) The image determination apparatus comprises:

an image pickup unit for picking up an image of a subject of image pickup;

a first illumination unit and a second illumination unit which are arranged in different positions and illuminate the subject of image pickup whose image is picked up by the image pickup unit; and a control unit using a change in shade on a first picked-up image at the time when an image of the subject of image pickup is picked up by the image pickup unit in a state in which the first illumination unit is turned on and the second illumination unit is turned off and a change in shade on a second picked-up image at the time when an image of the subject of image pickup is picked up by the image pickup unit in a state in which the first illumination unit is turned off and the second illumination unit is turned on to determine whether or not the subject of image pickup of the first and second picked-up images is a living body.

With this structure, the image determination apparatus uses a change in shades on the first and second picked-up image, which are picked up in the states in which one of the first and second illumination units arranged in the different positions is turned on and the other is turned off, to determine whether or not the subject of image pickup in these picked-up images is a living body or a nonliving body such as a photograph or a print.

In the case in which the subject of image pickup of the first and second picked-up images is a human (living body), since a human face has unevenness, when these two picked-up images are compared, different positions are shaded due to the difference of illumination. On the other hand, in the case in which the subject of image pickup of the first and second picked-up images is a photograph or a print (nonliving body), since the photograph or the print does not have unevenness on its surface, a change in shading due to the difference of illumination hardly appear. Therefore, the image determination apparatus can determine whether the subject of image pickup is a living body or a nonliving body from a way that the subject of image pickup is shaded on the first and second picked-up images.

(2) The first illumination unit is arranged in a position where the first illumination unit illuminates the subject of image pickup whose image is picked up by the image pickup unit from a right side thereof, and the second illumination unit is arranged in a position where the second illumination unit illuminates the subject of image pickup whose image is picked up by the image pickup unit from a left side thereof.

With this structure, a picked-up image in which the subject of image pickup is illuminated from the right side and a picked-up image in which the subject of image pickup is illuminated from the left side and picked up are obtained.

In the case in which the subject of image pickup is a living body, the left side is shaded on the picked up image in which the subject of image pickup is illuminated from the right side and are the right side is shaded on the picked-up image in which the subject of image pickup is illuminated from the left side on the contrary. On the other hand, in the case in which the subject of image pickup is a nonliving body such as a photograph or a print, a difference hardly appears in a way that the subject of image pickup is shaded on the picked-up image in which the subject of image pickup is illuminated from the right side and the picked-up image in which the subject of image pickup is illuminated from the left side.

Therefore, the image determination apparatus calculates a difference A between a luminance on a right side and a luminance on a left side of a subject in the picked-up image in which the subject of image pickup is illuminated from the right side and a difference B between a luminance on the right side and a luminance on the left side of the subject in the picked-up image in which the subject of image pickup is illuminated from the left side on the contrary, and determines whether or not the subject of image pickup is a living body based on magnitudes of the difference A and the difference B. Consequently, the image determination apparatus can eliminate an influence exerted on the determination by a state of luminance in a photograph or a print used as the subject of image pickup and can determine with a high accuracy whether or not the subject of image pickup is a living body.

In particular, in the case in which the subject of image pickup is a living body, in the picked-up image in which the subject of image pickup is illuminated from the right side, a right side of a nose and a cheek on the right side are illuminated and bright and a left side of the nose and a cheek on the left side is shaded and dark. On the contrary, in the picked-up image in which the subject of image pickup is illuminated from the left side, a left side of a nose and a cheek on the left side is illuminated and bright and a right side of the nose and a cheek on the right side is shaded and dark. Thus, it is desirable to use any one of the following as an area for calculating the differences A and B:

<1> the right side and the left side of the nose; and
<2> the cheek on the right side and the cheek on the left side.

In addition, the individual authentication apparatus of the invention can improve security against illegal acts using a photograph or a print as a subject of image pickup by applying the image determination apparatus thereto.

In addition, as a picked-up image to be used in authentication processing, a third picked-up image may be used which is picked up in a state in which a subject of image pickup is illuminated from its front by a third illumination unit, which is provided for illuminating a subject of image pickup from its front. Alternatively, a third picked-up image may be used which is picked up in a state in which the subject of image pickup is illuminated by both the first and second illumination units. Since a picked-up image in which shade caused by illumination is suppressed can be obtained by whichever image pickup method of the third picked-up image is adopted, a decrease in an accuracy of authentication can be prevented.

Moreover, if the first picked-up image or the second picked-up image is used for the authentication processing, authentication utilizing shades of characteristic parts of a living body which appear depending upon a direction of illumination can be performed, and further improvement of the accuracy of authentication can be realized.

DESCRIPTION OF THE PREFERRED EMBODIMENT

An embodiment of the present invention will be hereinafter described in detail with reference to the accompanying drawings.

Figure 1:
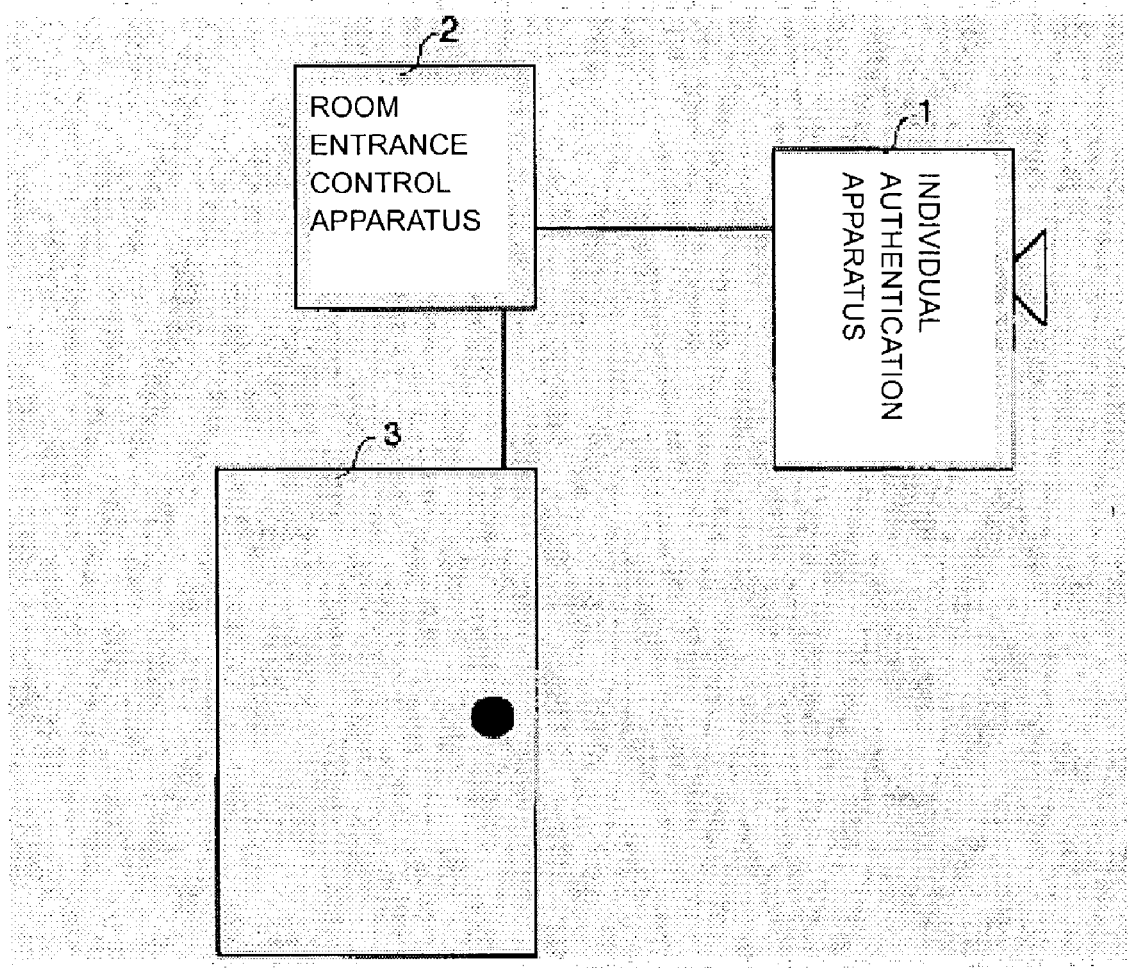
FIG. 1 is a block diagram showing a room entrance management system to which an individual authentication apparatus as an embodiment of the present invention is applied.

FIG. 1 is a block diagram showing a structure of a room entrance management system to which an individual authentication apparatus as an embodiment of the invention is applied. This room entrance management system is provided with an individual authentication apparatus 1 for determining whether or not a person desiring to enter a room (hereinafter referred to as subject of authentication) is a registered person who is allowed to enter the room and a room entrance control apparatus 2 for controlling locking/unlocking of a door 3 based upon a result of authentication in the individual authentication apparatus 1. The individual authentication apparatus 1 and the room entrance control apparatus 2 are connected by a data communication line.

Note that the individual authentication apparatus 1 and the room entrance control apparatus 2 may be constituted as an integral apparatus.

Figure 2:
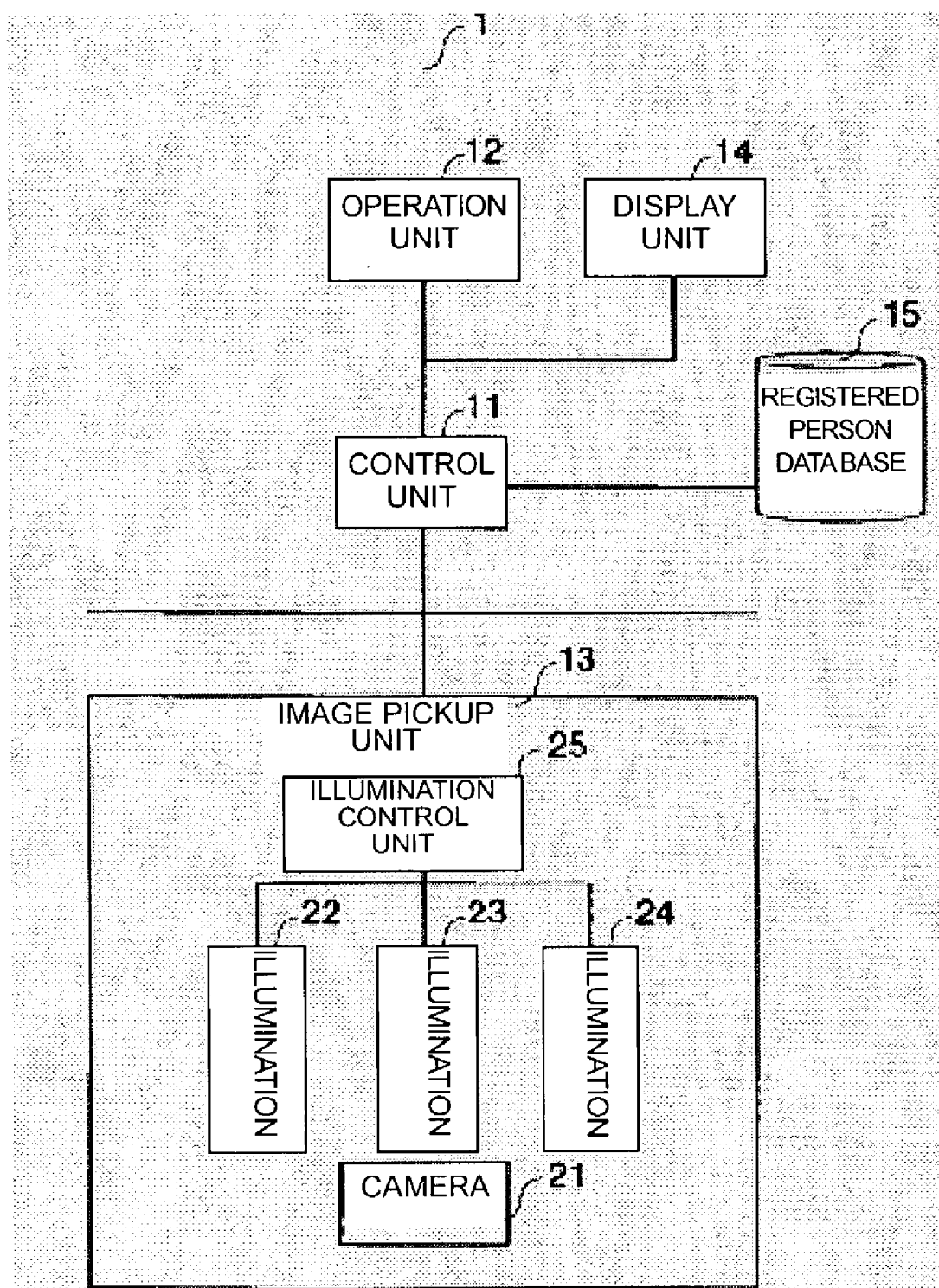
FIG. 2 is a block diagram showing a structure of the individual authentication apparatus as the embodiment of the invention.
Figure 3:
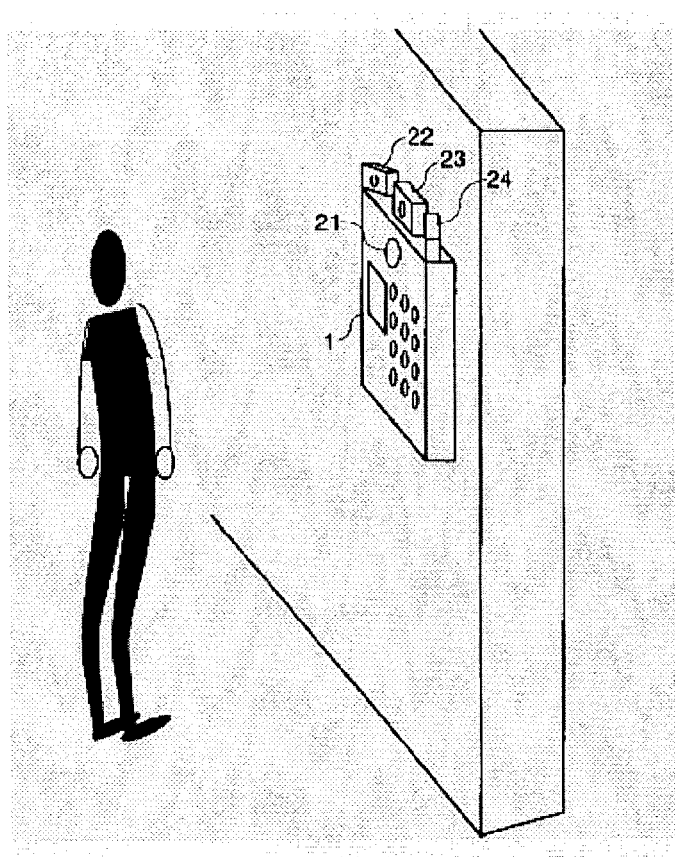
FIG. 3 is a view showing an example of installation of the individual authentication apparatus as the embodiment of the invention.

FIG. 2 is a block diagram showing a structure of the individual authentication apparatus of this embodiment. FIG. 3 is a view showing an example of installation of the individual authentication apparatus of this embodiment. The individual authentication apparatus 1 is provided with a control unit 11 for controlling operations of a main body of the individual authentication apparatus 1, an operation unit 12 in which keys for performing input operations are arranged, an image pickup unit 13 for picking up an image of a subject of authentication, a display unit 14 for displaying a message or the like to the subject of authentication, and a registered person database 15 in which data of characteristic parts (hereinafter referred to as characteristic amount data) of a living body such as eyes, a nose, and a mouth extracted from a face image picked up for each registered person. The image pickup unit 13 is provided with a camera 21 for picking up an image of the subject of authentication, three illuminations 22, 23, and 24 for illuminating the subject of authentication at the time of image pickup, and an illumination control unit 25 for controlling turning on/off of the illuminations 22 to 24 individually.

Figure 4:
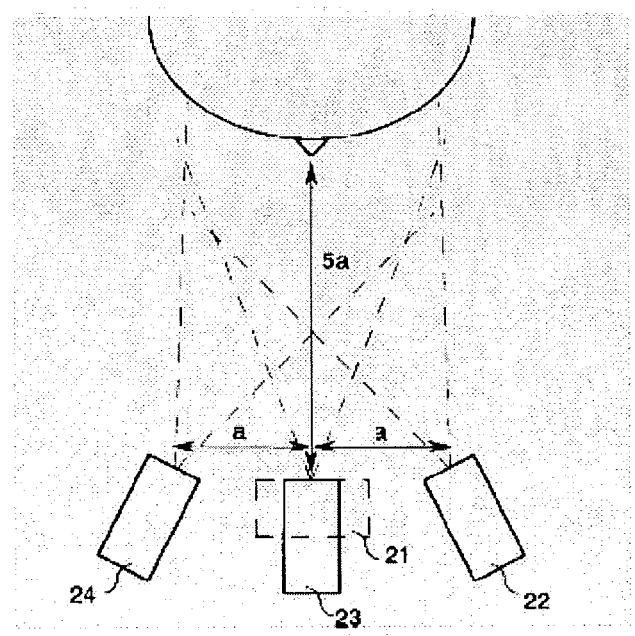
FIG. 4 is a view showing an arrangement relationship between illuminations and a camera in the individual authentication apparatus as the embodiment of the invention.

FIG. 4 is a view showing a positional relationship between a camera and the three illuminations. The illumination 22 is arranged in a position where the illumination 22 illuminates a subject of authentication, whose image is picked up by the camera 21, from his/her right side. The illumination 23 is arranged in a position where the illumination 23 illuminates the subject of authentication, whose image is picked up by the camera 21, from his/her front. The illumination 24 is arranged in a position where the illumination 24 illuminates the subject of authentication, whose image is picked up by the camera 21, from his/her left side. The illuminations 22 and 24 are arranged to be spaced apart by an appropriate distance "a" from a center of an image pickup lens of the camera 21. This distance "a" is approximately ⅕ of a distance from the image pickup lens of the camera 21 to the subject of authentication. The illumination 23 is arranged in substantially the center of the image pickup lens of the camera 21.

In the control unit 11, there is provided a memory having a memory area for storing a picked-up image which the camera 21 picks up in a state in which the illumination 22 is turned on and the illuminations 23 and 24 are turned off (hereinafter referred to as right direction illumination image), a memory area for storing a picked-up image which the camera 21 picks up in a state in which the illumination 23 is turned on and the illuminations 22 and 24 are turned off (hereinafter referred to as central direction illumination image), and a memory area for storing a picked-up image which the camera 21 picks up in a state in which the illumination 24 is turned on and the illuminations 22 and 23 are turned off (hereinafter referred to as left direction illumination image). The control unit 11 instructs the illumination control unit 25 to turn on/off the respective illuminations 22 to 24. The illumination control unit 25 controls turning on/off of the respective illuminations 22 to 24 in accordance with an instruction from the control unit 11 and, at the same time, informs the control unit 11 of a state of on/off of the respective illuminations 22 to 24.

Figure 5:
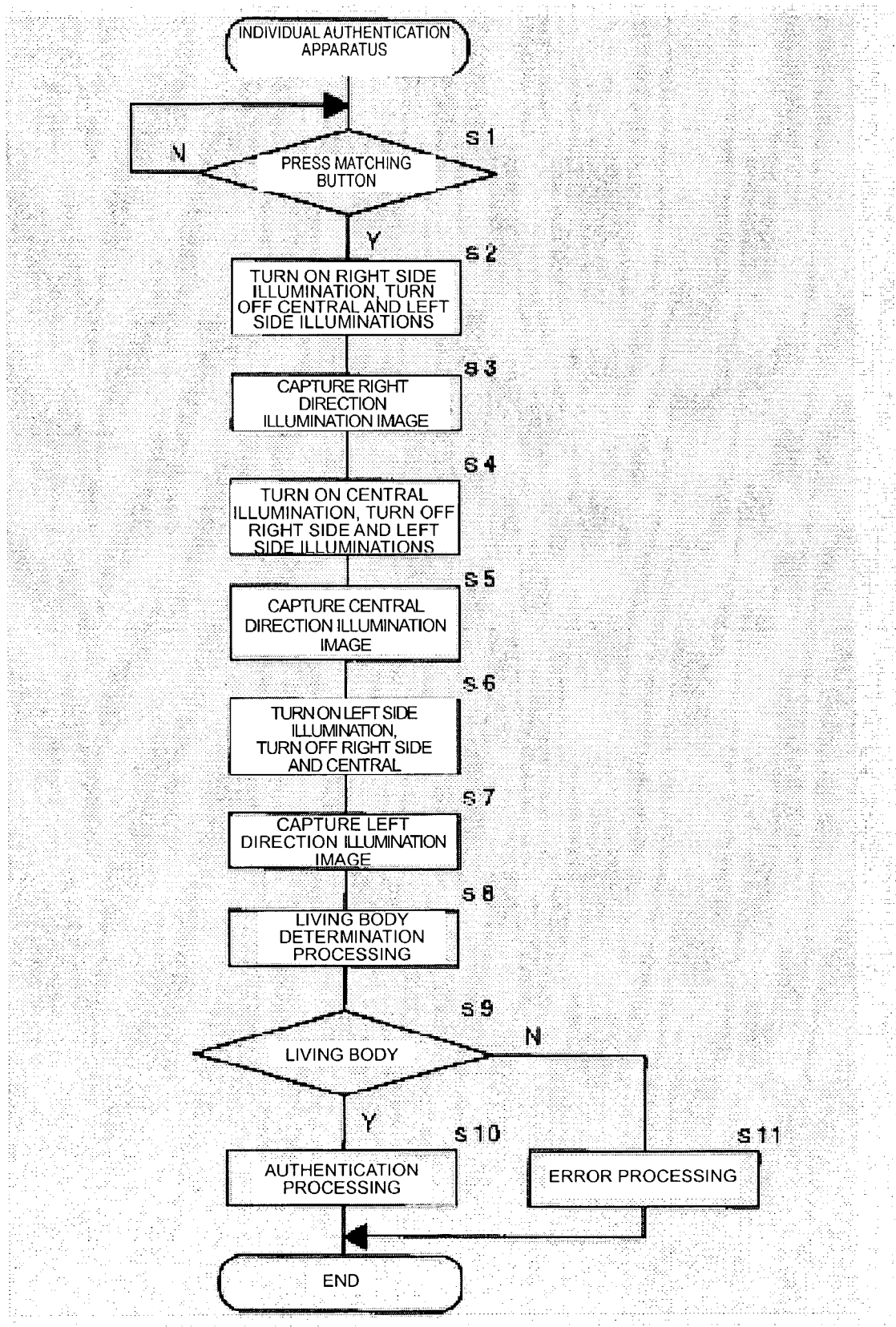
FIG. 5 is a flowchart showing operations of the individual authentication apparatus as the embodiment of the invention.

Next, operations of the individual authentication apparatus 1 of this embodiment will be described. FIG. 5 is a flowchart showing operation of the individual authentication apparatus 1 of this embodiment. When a matching button provided in the operation unit 12 is pressed (s1), the individual authentication apparatus 1 instructs the illumination control unit 25 to turn on the illumination 22 and turn off the illuminations 23 and 24 (s2). The illumination control unit 25 turns on the illumination 22 and turns off the illuminations 23 and 24 in accordance with the instruction from the control unit 2. The control unit 11 captures an image, which is being picked up by the camera 21 at this point as a right direction illumination image (s3). In this case, the control unit 11 confirms that a state of the respective illuminations 22 to 24 informed from the illumination control unit 25 is the state instructed in s2, and captures the image, which is being picked up by the camera 21 as the right direction illumination image.

Upon completion of capture of the right direction illumination image in s3, the control unit 11 instructs the illumination control unit 25 to turn on the illumination 23 and turn off the illuminations 22 and 24 (s4). The illumination control unit 25 turns on the illumination 23 and turns off the illuminations 22 and 24 in accordance with the instruction from the control unit 2. The control unit 11 captures an image, which is being picked up by the camera 21 at this point as a central direction illumination image (s5). In this case, the control unit 11 also confirms that a state of the respective illuminations 22 to 24 informed from the illumination control unit 25 is the state instructed in s4, and captures the image, which is being picked up by the camera 21 as the central direction illumination image.

Moreover, upon completion of capture of the central direction illumination image in s5, the control unit 11 instructs the illumination control unit 25 to turn on the illumination 24 and turn off the illuminations 22 and 23 (s6). The illumination control unit 25 turns on the illumination 24 and turns off the illuminations 22 and 23 in accordance with the instruction from the control unit 2. The control unit 11 captures an image, which is being picked up by the camera 21 at this point as a left direction illumination image (s7). In this case, the control unit 11 also confirms that a state of the respective illumination 22 to 24 informed from the illumination control unit 25 is the state instructed in s6, and captures the image, which is being picked up by the camera 21 as the left direction illumination image.

The right direction illumination image, the central direction illumination image, and the left direction illumination image captured in s3, s5, and s7 are stored in a predetermined memory area of the memory provided in the control unit 11.

A time required for the processing of s2 to s7 is in the order of a few seconds. The right direction illumination image, the central direction illumination image, and the left direction illumination image are captured continuously, whereby the subject of image pickup of the camera 21 is prevented from being replaced in the middle of the image pickup.

Note that an order of capturing the right direction illumination image, the central direction illumination image, and the left direction illumination image may not be the above-described order. However, it is preferable to pick up the central direction illumination image, which is used in authentication processing discussed later, in the second place and pick up the right direction illumination image and the left direction illumination image, which is used in living body determination processing, before or after picking up the central direction illumination image. This is because it is possible that a person committing an illegal act uses a photograph of a face of a registered person or a print of the face as a subject of image pickup at the time of picking up the central direction illumination image and, since the right direction illumination image and the left direction illumination image are not used in the authentication processing, uses his/her own face, a mannequin, or the like as a subject of image pickup for the right direction illumination image and the left direction illumination image. Here, if the central direction illumination image is picked up in the second place, the person committing an illegal act has to replace the subject of image pickup twice. Thus, it can be detected more accurately whether or not the subject of image pickup of the camera 21 is replaced in the middle of the image pickup.

Upon capturing the right direction illumination image, the central direction illumination image, and the left direction illumination image, the control unit 11 performs the living body determination processing for determining whether the subject of image pickup of the image picked up by the camera 21 is a human (living body) or a photograph or print (nonliving body) (s8).

Figure 6:
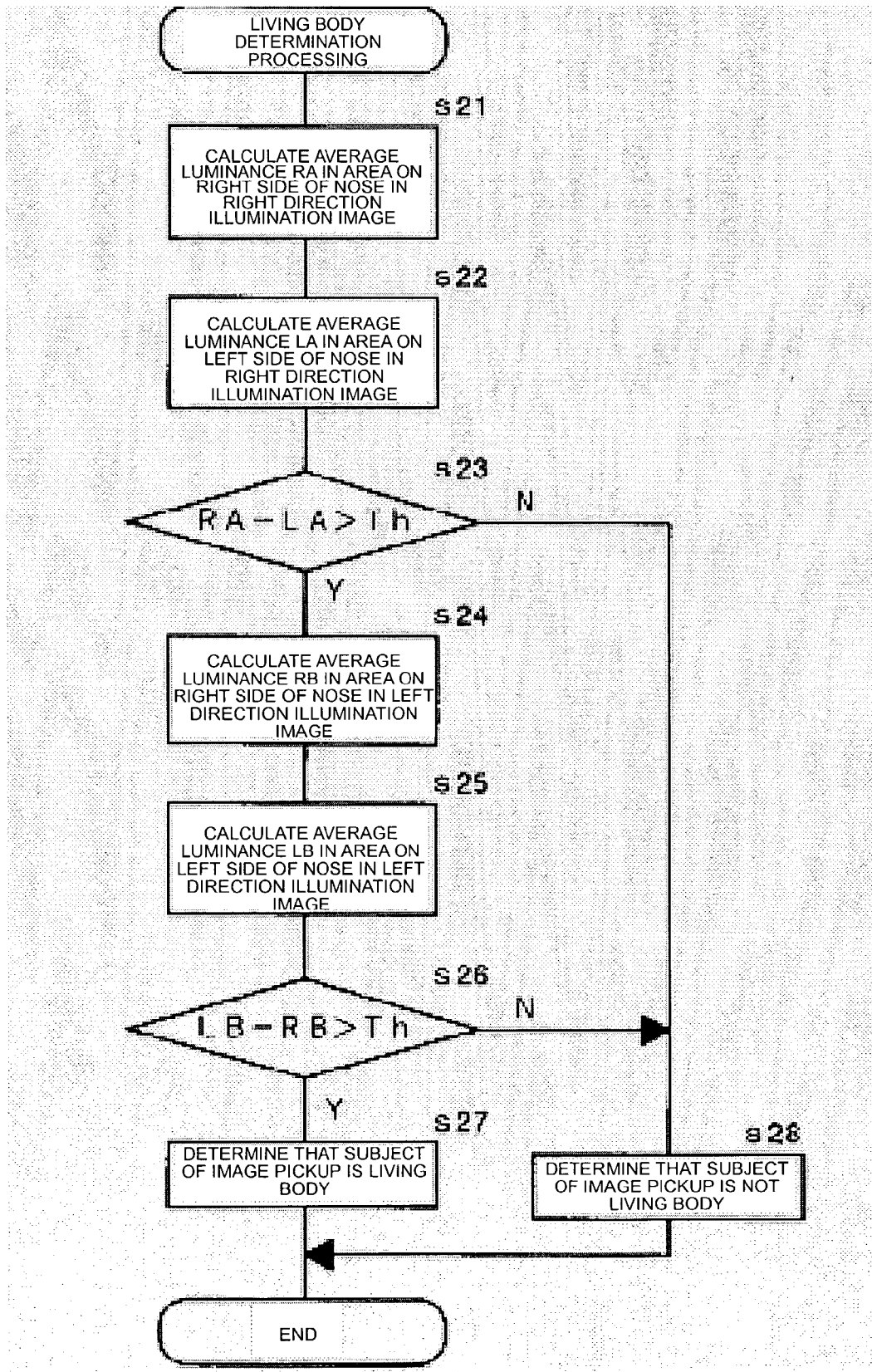
FIG. 6 is a flowchart showing living body determination processing in the individual authentication apparatus as the embodiment of the invention.

FIG. 6 is a flowchart showing the living body determination processing in accordance with s8. In this processing, the right direction illumination image and the left direction illumination image captured in s3 and s7 are used. The control unit 11 processes the right direction illumination image captured in s3 and calculates an average luminance RA in an area on the right side of a nose and an average luminance LA in an area on the left side of the nose (s21 and s22).

Figure 7:
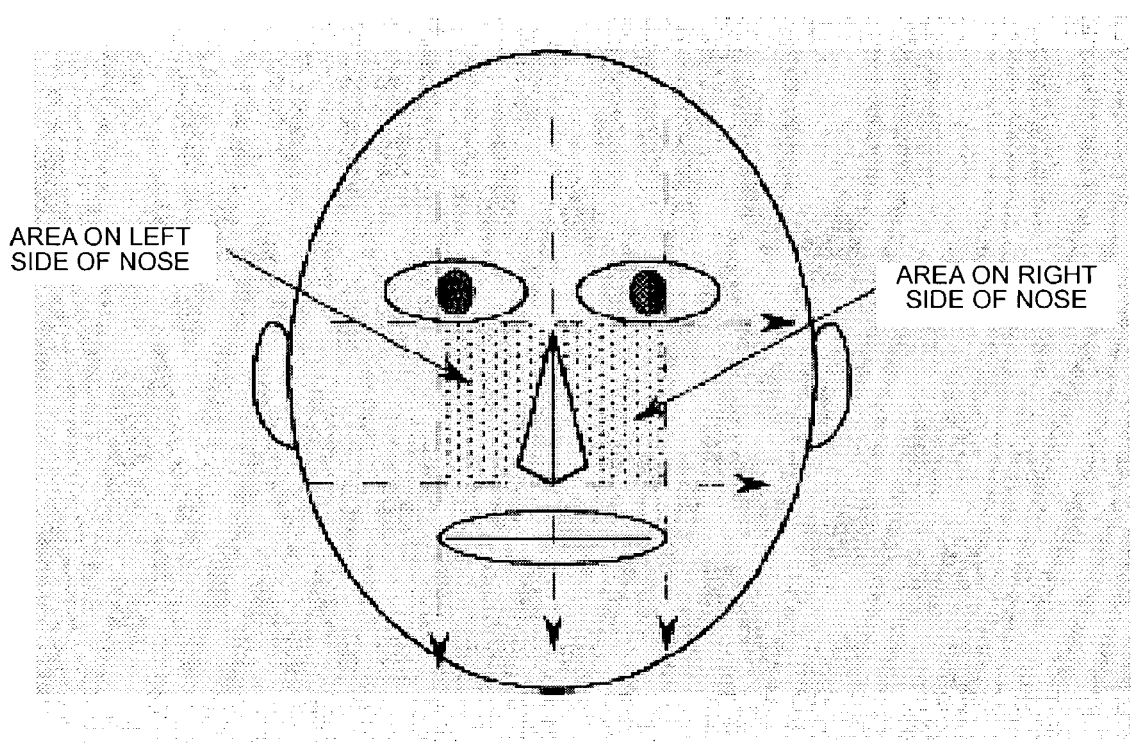
FIG. 7 is a view showing an area on a right side of a nose and an area on a left side of the nose.
Figure 8:
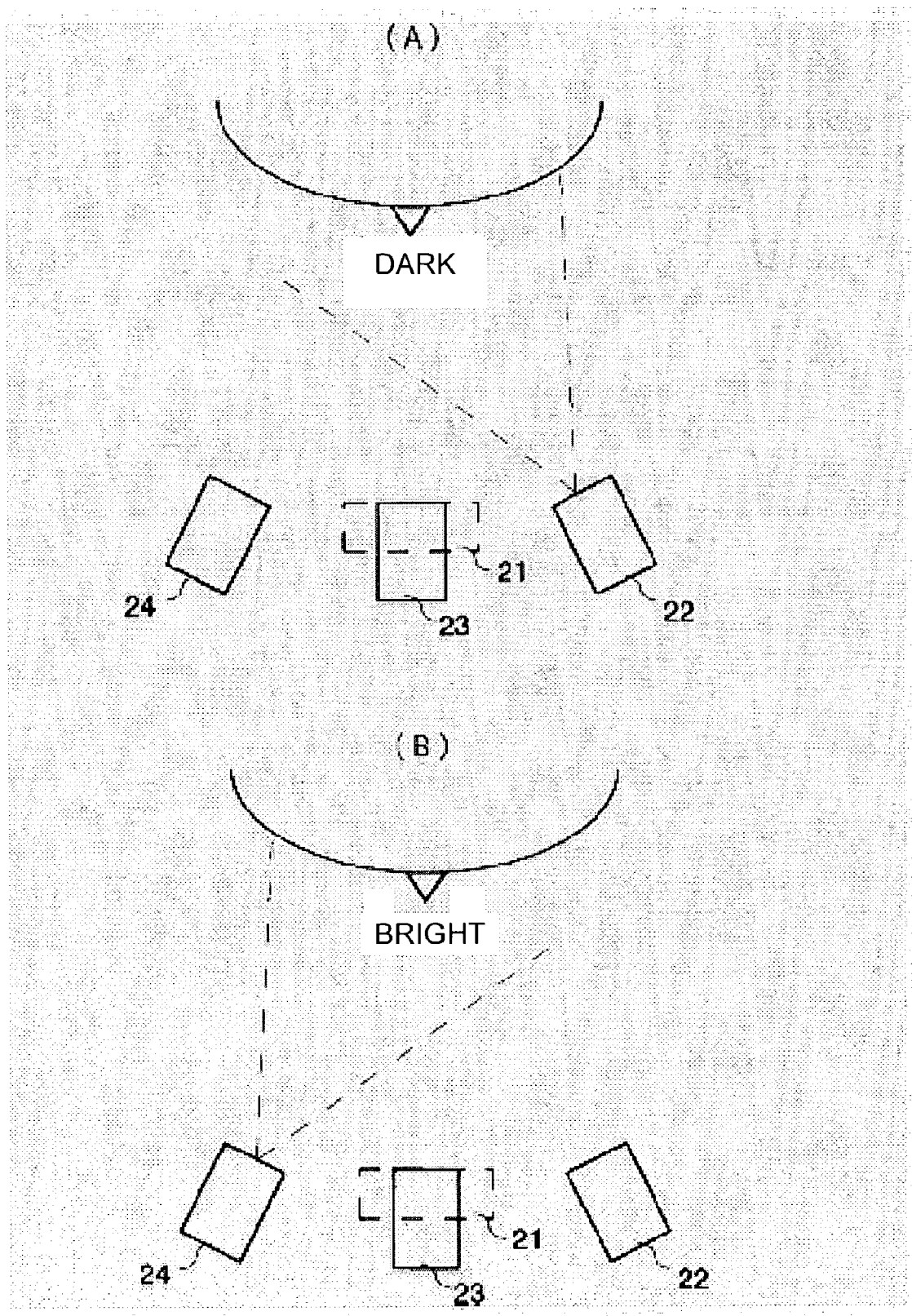
FIG. 8 is a view illustrating brightness and darkness on a right direction illumination image and a left direction illumination image.

FIG. 7 shows the area on the right side of the nose and the area on the left side of the nose. These areas are specified by detecting eyes and a nose of a subject of authentication in a picked-up image. More specifically, these areas extend between a part below the eyes and a part below the nose in its vertical direction and between sides of the nose and normals drawn down from the centers of the eyes in its horizontal direction. As shown in FIG. 8A, in the right direction illumination image, in the case in which the subject of image pickup is a living body (human), the area on the right side of the nose is illuminated by the illumination 22 and bright and the area on the left side of the nose is shaded and dark. On the other hand, in the case in which the subject of image pickup is a nonliving body (photograph or print), since the area on the left side of the nose is not shaded, a difference of brightness and darkness due to illumination does not appear in the area on the right side of the nose and the area on the left side of the nose.

The control unit 11 determines whether or not a difference between the average luminance RA in the area on the right side of the nose and the average luminance LA in the area on the left side of the nose is larger than a threshold value Th defined in advance (s23). In s23, the control unit 11 determines whether or not a condition RA−LA>Th is satisfied.

When it is determined in s23 that the above-described condition is not satisfied, the control unit 11 proceeds to s28 and determines that that the subject of image pickup is not a living body but a photograph or a print. On the contrary, when it is determined in s23 that the above-described condition is satisfied, the control unit 11 does not immediately determine that the subject of image pickup is a living body but processes the left direction illumination image captured in s7 and calculates an average luminance RB in the area on the right side of the nose and an average luminance LB in the area on the left side of the nose (s24 and s2S). As shown in FIG. 8B, in the left direction illumination image, in the case in which the subject of image pickup is a living body (human), the area on the left side of the nose is illuminated by the illumination 24 and bright and the area on the right side of the nose is shaded and dark. On the other hand, in the case in which the subject of image pickup is a nonliving body (photograph or print), since the area on the right side of the nose is not shaded, a difference of brightness and darkness due to illumination does not appear in the area on the right side of the nose and the area on the left side of the nose.

The control unit 11 determines whether or not a difference between the average luminance RB in the area on the right side of the nose and the average luminance LB in the area on the left side of the nose is larger than a threshold value Th defined in advance (s26). The threshold value Th used in s26 is the same as the threshold value Th used in s23.

In s26, the control unit 11 determines whether or not a condition LB−RB>Th is satisfied.

When it is determined in s26 that the above-described condition is not satisfied, the control unit 11 proceeds to s28 and determines that the subject of image pickup is not a living body but a photograph or a print. On the contrary, when it is determined in s26 that the above-described condition is satisfied, the control unit 11 determines that the subject of image pickup is a living body in s27 and ends this processing.

In this way, the individual authentication apparatus 1 of this embodiment utilizes a difference between a face of a human (living body) and a surface of a photograph or a print in that the former has unevenness and the latter does not have unevenness and is flat to determine whether or not a subject of image pickup is a living body according to whether or not a shaded place changes in two picked-up images which are picked up by changing a direction of illumination. Therefore, the individual authentication apparatus 1 can determine whether or not the subject of image pickup is a living body with an addition of a simple structure, and increase in costs of a main body thereof can be controlled sufficiently.

In addition, a structure for determining whether or not a subject of image pickup is a living body using two picked-up images of a right direction illumination image and a left direction illumination image. Thus, for example, in the case in which a photograph in which an area on a right side of a nose is bright and an area on a left side of the nose is dark is used as a subject of image pickup, even if the subject of image pickup is not determined to be a nonliving body in the determination of s23, it is determined as a nonliving body in the determination of s26. Therefore, whatever a distribution of brightness and darkness of the photograph or the print used as the subject of image pickup is, the individual authentication apparatus 1 can determine whether or not the subject of image pickup is a living body with a high accuracy without being affected by this distribution.

Referring back to FIG. 5, in the case in which it is determined in the living body determination processing in accordance with s8 that the subject of image pickup is not a living body, the control unit 11 performs error processing and ends this processing (s9 and s11). In this case, the individual authentication apparatus 1 does not instruct the room entrance control apparatus 2 to unlock the door 3. Therefore, it is possible to prevent a person who attempts to enter a room illegally using a photograph or a print from entering the room, and improvement of security can be realized.

On the contrary, in the case in which it is determined that the subject of image pickup is a living body, the control unit 11 performs authentication processing and ends this processing (s9 and s10).

Figure 9:
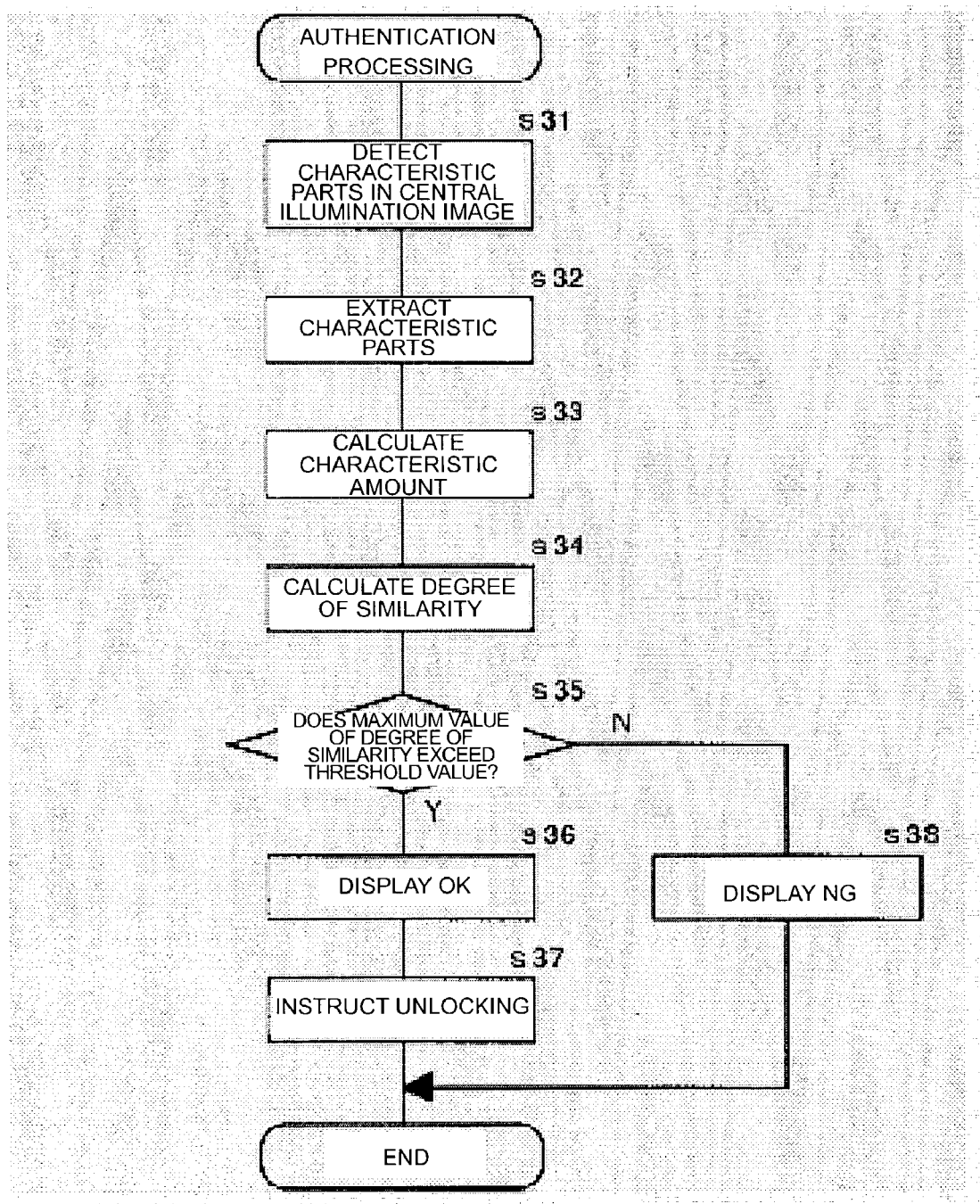
FIG. 9 is a flowchart showing authentication processing in the individual authentication apparatus as the embodiment of the invention.

FIG. 9 is a flowchart showing the authentication processing in accordance with s10. The central direction illumination image obtained in s5 is used in this authentication processing. The control unit 11 processes the central direction illumination image to extract characteristic parts such as eyes, a node, and a mouth of the subject of authentication (s31), extracts the characteristic parts detected here (s32), and calculates characteristic amounts of the characteristic parts extracted in s32 (s33). In s31 to s33, only the characteristic amounts of the characteristic parts set in advance are calculated. In addition, concerning the characteristic parts for which characteristic amounts are calculated in s33, characteristic amount data is registered in the database 15 for each registered person.

The individual authentication apparatus 1 calculates a degree of similarity between the characteristic amounts calculated in s33 and the characteristic amount data of each registered person who is registered in the database 15 (s34). If a maximum value of the degree of similarity calculated in s34 exceeds a threshold value defined in advance, the individual authentication apparatus 1 determines that the subject of authentication is a registered person to display "OK" on the display unit 14 (s35 and s36) and, at the same time, instructs the room entrance control apparatus 2 to unlock the door 3 (s37). On the contrary, if the maximum value of the degree of similarity calculated in s34 does not exceed the threshold value set in advance, the individual authentication apparatus 1 determines that the subject of authentication is not a registered person to display "NG" on the display unit 14 (s35 and s38). In this case, the individual authentication apparatus 1 does not instruct the room entrance control apparatus 2 to unlock the door 3.

In this way, the individual authentication apparatus 1 of this embodiment utilizes a right direction illumination image and a left direction illumination image to determine whether or not a subject of authentication is a living body and performs the error processing if the subject of authentication is not a living body. Therefore, improvement of security against illegal acts using a photograph or a print can be realized.

Figure 10:
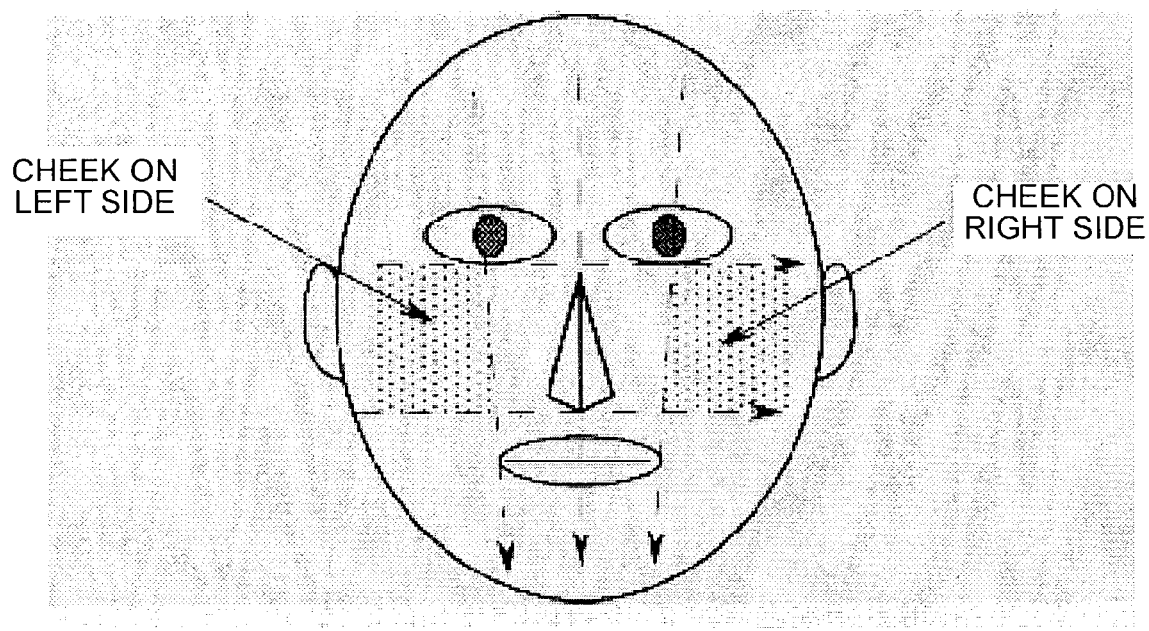
FIG. 10 is a view showing a cheek on the right side area and a cheek on the left side area.

In addition, in the above-described embodiment, the individual authentication apparatus 1 determines whether or not a subject of authentication is a living body from a luminance difference between an area on a right side of a nose and an area on a left side of the nose. However, the individual authentication apparatus 1 may determine whether or not a subject of authentication is a living body from a luminance difference between a cheek on the right side area and a cheek on the left side area as shown in FIG. 10. As in the area on the right side of the nose, the cheek on the right side area is bright in the case in which it is illuminated from a right direction and is shaded and dark in the case in which it is illuminated from a left direction. On the contrary, as in the area on the left side of the nose, the cheek on the left side area is bright in the case in which it is illuminated from the left direction and is shaded and dark in the case in which it is illuminated from the right direction. Therefore, the same effect can be obtained even if the area on the right side of the nose and the area on the left side of the nose in the above-described embodiment are replaced with the cheek on the right side area and the cheek on the left side area.

Note that the cheek on the right side area and the cheek on the left side area are areas in the outside of lines connecting centers of the eyes and ends of the mouth and extending from a part below the eyes to a part below the nose.

In addition, in the above-described embodiment, a central direction illumination image is used in the authentication processing in accordance with s10. However, an image picked up in a state in which both the illuminations 22 and 24 are turned on may be used in place of the central direction illumination image. In this case, the illumination 23 becomes unnecessary, and reduction of costs for the apparatus main body can be realized.

Note that it is sufficient to turn on the illuminations 22 and 24 in s4 and capture the both direction illumination image in s5 in the above-described embodiment.

In addition, the illuminations 23 and 24 may be removed and, at the same time, a moving mechanism unit for moving the illumination 22 may be provided. In this case, it is sufficient to move the illumination 22 to obtain a right direction illumination image, a central direction illumination image, and a left direction illumination image.

In addition, in the above-described embodiment, only a central direction illumination image is used to perform the authentication processing in accordance with s10. However, it is also possible to pick up a right direction illumination image, a central direction illumination image, and a left direction illumination image for each registered person at the time of registration, store characteristic amount data of characteristic parts extracted for each picked-up image in the registered person database 15, and use the right direction illumination image and the left direction illumination image as well for the authentication processing. Since a plurality of picked-up images with different directions of illumination are used in the authentication processing, authentication taking into account unevenness on a face such as a height of a nose or a hollow of an eye can be performed, and an accuracy of authentication can be further improved.

Further, in the above-described embodiment, degrees of similarity of a subject of authentication with all registered persons registered in the registered person database 15 are calculated in the authentication processing, and the subject of authentication is authenticated using a maximum value of the degree of similarity calculated here. However, it is also possible to cause a subject of authentication to input an identification number or the like, calculate a degree of similarity only for a registered person identified by the identification number inputted here, and authenticate the subject of authentication using the degree of similarity calculated here.

Moreover, in the above-described embodiment, when the matching button provided in the operation unit 12 is pressed, a right direction illumination image, a central direction illumination image, and a left direction illumination image are captured to perform the living body determination processing and the authentication processing. However, it is also possible to provide an infrared ray sensor or the like for detecting a human and, when a human is detected by the sensor, capture a right direction illumination image, a central direction illumination image, and a left direction illumination image to perform the living body determination processing and the authentication processing.

Note that, although an example in which the individual authentication apparatus in accordance with the invention is applied to a room entrance management system for restraining entrance to a room is described in the above-described embodiment, the individual authentication apparatus can be utilized in other types of apparatus and system, for example, a transaction processing apparatus such as an ATM or a CD.

As described above, according to the invention, since it is possible to determine whether a subject of image pickup of an image picked up by a camera is a living body or a nonliving body such as a photograph or a print, security against illegal acts using a photograph or a print can be improved.

What is claimed is:

1. An image determination apparatus comprising:
   an image pickup unit for picking up an image of a subject of image pickup;
   a first illumination unit and a second illumination unit which are arranged in different positions and illuminate the subject of image pickup whose image is picked up by the image pickup unit;
   a control unit using a change in shade on a first picked-up image at the time when an image of the subject of image pickup is picked up by the image pickup unit in a state in which the first illumination unit is turned on and the second illumination unit is turned off, and a change in shade on a second picked-up image at the time when an image of the subject of image pickup is picked up by the image pickup unit in a state in which the first illumination unit is turned off and the second illumination unit is turned on, to determine whether or not the subject of image pickup of the first and second picked-up images is a living body; and
   a third illumination unit arranged in a position where the third illumination unit illuminates a subject of image pickup from its front,
   wherein an authentication function is provided in the control unit which authenticates a person who is a subject of image pickup using a third picked-up image in which an image of the subject of image pickup is picked up by the image pickup unit in a state in which both the first and second illumination units are turned on.

2. The image determination apparatus according to claim 1, wherein:
   the first illumination unit is arranged in a position where the first illumination unit illuminates the subject of image pickup whose image is picked up by the image pickup unit from a right side thereof, and the second illumination unit is arranged in a position where the second illumination unit illuminates the subject of image pickup whose image is picked up by the image pickup unit from a left side thereof.

3. The image determination apparatus according to claim 2, wherein:
   the control unit determines whether or not the subject of image pickup of the first and second picked-up images is a living body according to whether or not a nose of the subject of image pickup is a nose with unevenness from the change in the first and second picked-up images.

4. The image determination apparatus according to claim 2, wherein:
   the control unit determines whether or not the subject of image pickup of the first and second picked-up images is a living body for each of the first and second picked-up images based on a difference between a luminance on a right side of a nose and a luminance on a left side of the nose.

5. The image determination apparatus according to claim 2, wherein:
   the control unit determines whether or not the subject of image pickup of the first and second picked-up images is a living body for each of the first and second picked-up images based on a difference between a luminance of a cheek on the right side and a luminance of a cheek on the left side.

6. The image determination apparatus according to claim 1, wherein:
   the authentication function of the control unit authenticates a person who is a subject of image pickup using at least one of the first picked-up image and the second picked-up image.

7. An individual authentication apparatus comprising:
   an image pickup unit for picking up an image of a subject;
   first and second illumination units arranged in different positions; and
   a control unit for:
     causing the image pickup unit to pick-up a first image of the subject with the first illumination unit turned on and the second illumination unit turned off;
     causing the image pickup unit to pick-up a second image of the subject with the first illumination unit turned off and the second illumination unit turned on;
     determining from the first and second images whether or not the subject is that of a living body; and
     if the subject is that of a living body:
       causing the image pickup unit to pick-up a third image of the subject; and
       initiating an authentication function, the authentication function using the third image to determine whether or not to authorize the subject; and
     if the subject picked-up is not a living body, the control unit initiates an error processing without causing the image pickup to pick-up the third image.

8. The individual authentication apparatus of claim 7, wherein:
   if the control unit causing the image pickup unit to pick-up a third image of the subject, the control unit causes the image pickup unit to pick-up the third image of the subject with the first illumination unit and second illumination unit turned on.

9. The individual authentication apparatus of claim 7, wherein:
   the authentication function causes the image pickup unit to take another first or second image and uses the another first or second image along with the third image to determine whether or not to authorize the subject.

10. The individual authentication apparatus of claim 7, wherein:
    the first illumination unit is arranged in a position where the first illumination unit illuminates the subject from a right side thereof, and the second illumination unit is arranged in a position where the second illumination unit illuminates the subject from a left side thereof.

11. The individual authentication apparatus of claim 10, wherein:
the control unit determines whether or not the subject is a living body according to whether or not a nose of the subject is a nose with unevenness from a change in the first and second images.

12. The individual authentication apparatus of claim 10, wherein:
the control unit determines whether or not the subject is a living body based on a difference between a luminance on a right side of a nose and a luminance on a left side of the nose.

13. The individual authentication apparatus of claim 10, wherein:
the control unit determines whether or not the subject is a living body based on a difference between a luminance of a cheek on the right side and a luminance of a cheek on the left side.

14. An individual authentication apparatus comprising:
an image pickup unit for picking-up an image of a subject;
first, second, and third illumination units arranged in different positions; and
a control unit for:
causing the image pickup unit to pick-up a first image of the subject with the first illumination unit turned on and the second illumination unit turned off;
causing the image pickup unit to pick-up a second image of the subject with the first illumination unit turned off and the second illumination unit turned on;
determining from the first and second images whether or not the subject is that of a living body; and
if the subject is that of a living body:
causing the image pickup unit to pick-up a third image with the first illumination unit and second illumination unit turned off and the third illumination unit turned on; and
initiating an authentication function, the authentication function using the third image to determine whether or not to authorize the subject; and
if the subject picked-up is not a living body, the control unit initiates an error processing without causing the image pickup to pick-up the third image.

15. The individual authentication apparatus of claim 14, wherein:
the third illumination unit illuminates the subject from its front.

16. The individual authentication apparatus of claim 14, wherein:
the authentication function causes the image pickup unit to take another first or second image and uses the another first or second image along with the third image to determine whether or not to authorize the subject.

17. The individual authentication apparatus of claim 16, wherein:
the third illumination unit illuminates the subject from its front.

18. The individual authentication apparatus of claim 14, wherein:
the first illumination unit is arranged in a position where the first illumination unit illuminates the subject from a right side thereof, and the second illumination unit is arranged in a position where the second illumination unit illuminates the subject from a left side thereof.

19. The individual authentication apparatus of claim 18, wherein:
the control unit determines whether or not the subject is a living body according to whether or not a nose of the subject is a nose with unevenness from a change in the first and second images.

20. The individual authentication apparatus of claim 18, wherein:
the control unit determines whether or not the subject is a living body based on a difference between a luminance on a right side of a nose and a luminance on a left side of the nose.

21. The individual authentication apparatus of claim 18, wherein:
the control unit determines whether or not the subject is a living body based on a difference between a luminance of a cheek on the right side and a luminance of a cheek on the left side.

22. An individual authentication apparatus comprising:
an image pickup unit for picking-up an image of a subject;
first, second, and third illumination units arranged in different positions; and
a control unit for:
causing the image pickup unit to pick-up a first image of the subject with the first illumination unit turned on and the second illumination unit turned off;
causing the image pickup unit to pick-up a second image of the subject with the first illumination unit turned off and the second illumination unit turned on;
determining from the first and second images whether or not the subject is that of a living body; and
if the subject is that of a living body:
causing the image pickup unit to pick-up a third image with the first illumination unit and second illumination unit turned on; and
initiating an authentication function, the authentication function using the third image to determine whether or not to authorize the subject; and
if the subject picked-up is not a living body, the control unit initiates an error processing without causing the image pickup to pick-up the third image.

* * * * *